United States Patent [19]

Karl

[11] Patent Number: 5,740,681

[45] Date of Patent: Apr. 21, 1998

[54] METHOD AND APPARATUS FOR CONTROLLING THE TEMPERATURE OF AIR DELIVERED TO THE CABIN OF A MOTOR VEHICLE

[75] Inventor: Stefan Karl, Paris, France

[73] Assignee: Valeo Climatisation, La Verriere, France

[21] Appl. No.: 770,081

[22] Filed: Dec. 19, 1996

[30] Foreign Application Priority Data

Dec. 21, 1995 [FR] France ................ 95 15288

[51] Int. Cl.⁶ .................................................. F25B 13/00
[52] U.S. Cl. ................... 62/324.6; 62/115; 62/117; 237/2 B
[58] Field of Search ................ 62/324.1, 324.6, 62/115, 117, 119; 237/2 B

[56] References Cited

U.S. PATENT DOCUMENTS

| 5,291,941 | 3/1994 | Enomoto et al. | |
| 5,343,935 | 9/1994 | Sumitani | 237/2 B X |
| 5,361,601 | 11/1994 | Han et al. | 237/2 B X |

FOREIGN PATENT DOCUMENTS

| 2717126 | 9/1995 | France . | |
| 2720982 | 12/1995 | France . | |
| 36466 | 2/1991 | Japan | 62/324.1 |
| 2235970 | 3/1991 | United Kingdom | 62/324.6 |

OTHER PUBLICATIONS

French Search Report dated 19 Sep. 1996.

*Primary Examiner*—Henry A. Bennett
*Assistant Examiner*—Susanne C. Tinker
*Attorney, Agent, or Firm*—Morgan & Finnegan, LLP

[57] ABSTRACT

An air conditioning circuit of a motor vehicle is used for heating the cabin of the vehicle. The air conditioning circuit accordingly operates in a cooling mode and a heating mode, selectively. In the heating mode, the refrigerant fluid flowing in the air conditioning circuit flows in a branch of the circuit which bypasses the condenser. The evaporator therefore receives this fluid in the gaseous state and acts as a heat exchanger for dissipating the heat produced in the compressor. The heat dissipated by the evaporator can be used for heating the cabin when that produced by the engine of the vehicle is insufficient for this purpose. To this end, an ejector draws a complementary mass of fluid into the heating loop for the purpose of adjusting the heat energy produced.

12 Claims, 4 Drawing Sheets

5,740,681

1

METHOD AND APPARATUS FOR CONTROLLING THE TEMPERATURE OF AIR DELIVERED TO THE CABIN OF A MOTOR VEHICLE

FIELD OF THE INVENTION

This invention relates to a method of regulating the temperature of an air stream to be delivered into the cabin of a vehicle, by exchange of fluid with an evaporator in which there flows a refrigerant fluid, which also passes into a compressor and into an expansion device, the said method including a cooling mode of the air stream, in which the said fluid is caused to flow successively into the evaporator, into the compressor, into a condenser in which it gives up heat to another medium, and into an expansion device, together with a heating mode of the air stream, in which the fluid leaving the compressor is passed to the evaporator without passing through a condenser.

The invention equally relates to air conditioning apparatus for the cabin of a motor vehicle, comprising a refrigerant fluid circuit which includes: a first branch which contains an evaporator followed by a compressor; a second branch containing a condenser; and a third branch which does not contain a condenser, the second and third branches being connected in parallel with each other so as to constitute, with the first branch, respectively, a cooling loop which also contains a first expansion device interposed between the condenser and the evaporator, and a heating loop, with switching means being provided for controlling the circulation of fluid so that the fluid flows in the cooling loop or in the heating loop selectively, the apparatus further including means for delivering into the cabin air which has undergone heat exchange with the evaporator.

BACKGROUND OF THE INVENTION

A method and an apparatus as set forth above are known from French patent specification No. FR 2 717 126A. The heat energy produced in the heating mode is determined by the mass flow produced by the compressor, which is itself a function of the speed at which the compressor is driven, and consequently of the prevailing running mode of the engine of the vehicle. The amount of this heat energy may be lower than that which is required for heating the cabin of the vehicle. In particular, in the event of low temperature starting of the engine, the initial density of the fluid in the air conditioning circuit, and consequently the mass flow produced by the compressor, are insufficient to provide satisfactory heating.

DISCUSSION OF THE INVENTION

The object of the invention is to provide a remedy for the above mentioned drawbacks, and to enable the air conditioning apparatus to be used for heating purposes, especially at low temperatures, by suitable correction of the heat energy produced in the air conditioning circuit.

According to the invention in a first aspect, a method of regulating the temperature of an air stream to be delivered into the cabin of a vehicle, by exchange of fluid with an evaporator in which there flows a refrigerant fluid, which also passes into a compressor and into an expansion device, the said method including a cooling mode of the air stream, in which the said fluid is caused to flow successively into the evaporator, into the compressor, into a condenser in which it gives up heat to another medium, and into an expansion device, together with a heating mode of the air stream, in

2 which the fluid leaving the compressor is passed to the evaporator without passing through a condenser, is characterised in that, when the mass flow of the fluid flowing in the evaporator in the heating mode is insufficient to produce the required heat energy, the mass of fluid in circulation is augmented by adding to the said mass flow an incident flow of fluid taken from the condenser by an aspiration effect produced by the said mass of fluid in circulation.

According to the invention in a second aspect, air conditioning apparatus for the cabin of a motor vehicle, comprising a refrigerant fluid circuit which includes: a first branch which contains an evaporator followed by a compressor; a second branch containing a condenser; and a third branch which does not contain a condenser, the second and third branches being connected in parallel with each other so as to constitute, with the first branch, respectively, a cooling loop which also contains a first expansion device interposed between the condenser and the evaporator, and a heating loop, with switching means being provided for controlling the circulation of fluid so that the fluid flows either in the cooling loop or in the heating loop selectively, the apparatus further including means for delivering into the cabin air which has undergone heat exchange with the evaporator, is characterised in that the heating loop contains an ejector having a side inlet which is connectable to the second branch through a fourth branch, whereby to draw fluid from the condenser by aspiration under the effect of the stream of fluid passing through the ejector, whereby to augment the mass of fluid circulating in the heating loop.

The term "ejector" is to be understood to mean any component of a fluid circuit which includes a nozzle or venturi, or in general terms a passage of reduced cross section which generates a jet of fluid, accompanied by a reduction in pressure which enables a stream of fluid to be drawn by aspiration from a source outside the ejector, so as to become an incident flow joining the body of fluid flowing in the circuit in which the ejector is connected.

The apparatus preferably includes a valve interposed in the fourth branch and controlled in such a way as to permit, or to cut off, the flow of fluid in the latter.

The said switching means are preferably adapted to put into communication, either the downstream end of the first branch with the upstream end of the second branch, or, simultaneously, the downstream end of the first branch with the upstream end of the third branch and the upstream end of the second branch with the upstream end of the fourth branch. In a preferred version of this arrangement, the said switching means are adapted to put into communication with each other the upstream ends of the third and fourth branches, and at the same time to put into communication with each other the downstream end of the first branch and the upstream end of the second branch.

Preferably, the ejector is disposed in the third branch.

The ejector preferably also constitutes the expansion device of the heating loop.

An expansion device for the heating loop is preferably connected in series with the ejector in the third branch.

Preferably, the ejector is disposed in the first branch. The ejector is also preferably interposed between the evaporator and the compressor.

Preferably, a take-off duct, which includes a controlled valve, is connected in parallel with the ejector.

An element for preventing reverse flow of the fluid is preferably disposed in the first branch.

The various features and advantages of the invention will appear more clearly on a reading of the following detailed description of some preferred embodiments of the invention, which is given by way of example only and with reference to the accompanying drawings, in which those elements which are identical or similar to each other are designated in all the Figures of the drawings by the same reference numerals.

DESCRIPTION OF PREFERRED EMBODIMENTS OF THE INVENTION

Figure 1:
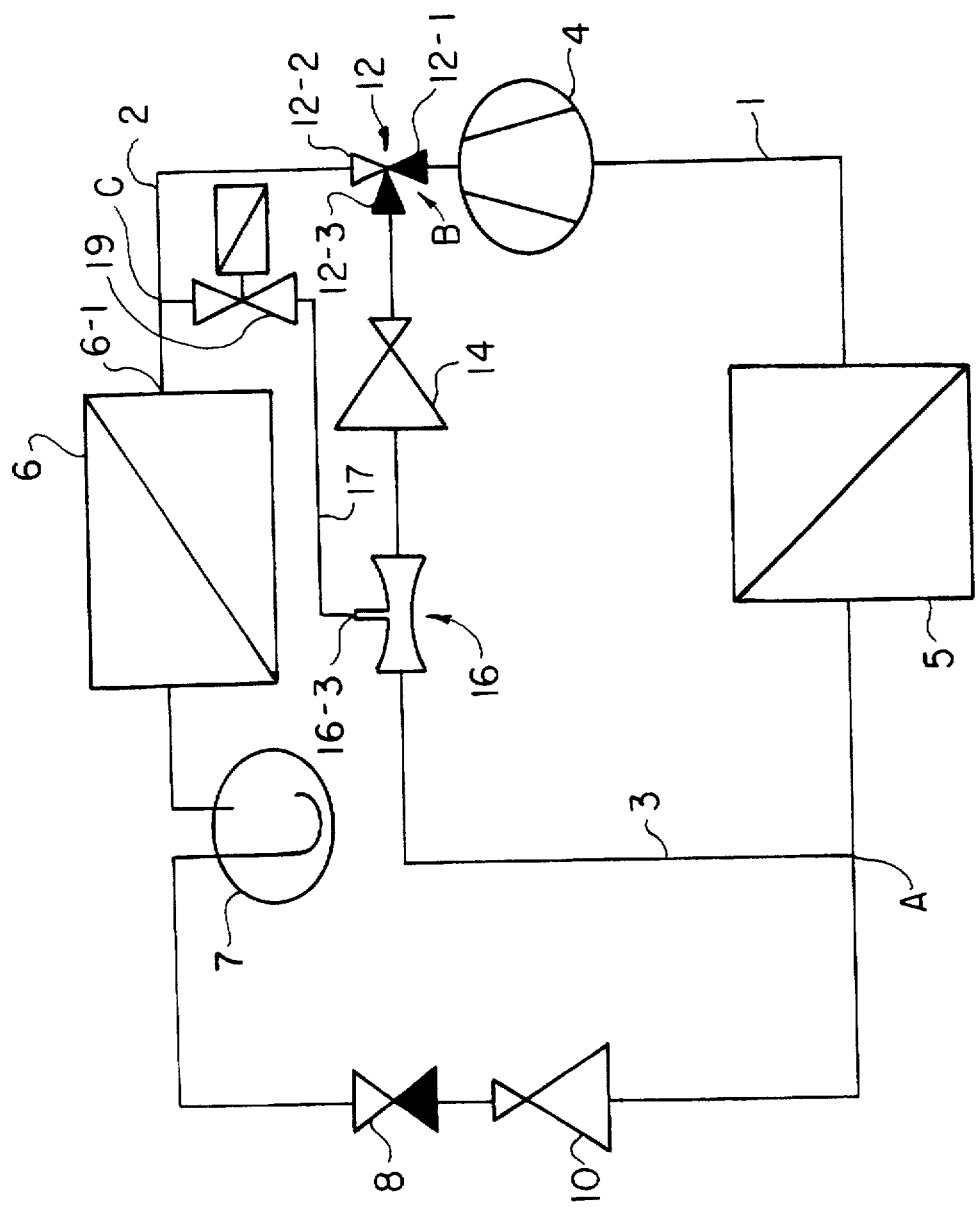
FIGS. 1 to 4 are circuit diagrams for fluid circuits in four embodiments, respectively, of an apparatus in accordance with the invention, for the air conditioning and heating of the cabin of a vehicle.

In the circuits shown in the drawings, there flows a fluid which is such as to pass from the liquid state to the gaseous state by absorbing heat, and from the gaseous state to the liquid state by giving up heat, as is usually the case in air conditioning installations for vehicles. Most of the components of these circuits are also commonly encountered in such air conditioning installations.

The components of the circuit, in each of the cases shown respectively in FIGS. 1 to 4, are located in three branches 1, 2 and 3 which are joined together at two junction points A and B. The first branch 1 contains a compressor 4 which drives the fluid in that branch from the point A to the point B, and an evaporator 5 which is connected upstream of the compressor. The second branch 2 contains, in this order going from the point B towards the point A, a condenser 6, a bottle 7, a non-return valve 8, and an expansion device 10.

In the circuit shown in FIG. 1, a second expansion device 14 is connected in the third branch 3, followed by an ejector 16 which has a side inlet 16-3, connected through a fourth branch, or stop duct, 17 to a point C in the branch 2, situated upstream of the condenser 6. The stop duct 17 contains a controlled stop valve 19.

A switching device, in the form of a three-way electrically operated changeover valve 12, is connected at the junction point B, in such a way that its three ways, 12-1, 12-2 and 12-3, are connected respectively with: the downstream end of the first branch 1, that is to say with the outlet of the compressor 4; the upstream end of the second branch 2, that is to say with the inlet 6-1 of the condenser 6; and the upstream end of the third branch 3, that is to say with the inlet side of the second expansion device 14.

The three-way valve 12 can be set so as to put into communication with each other its ways indicated at 12-1 and 12-2. The fluid then flows in a closed cooling loop which is constituted by the branches 1 and 2, the branch 3 being isolated. This loop operates as a conventional air conditioning circuit, with the fluid passing from the liquid state to the gaseous state in the evaporator 5 by absorbing heat, and from the gaseous state to the liquid state in the condenser 6 by giving up heat. The heat absorbed in the evaporator 5 can be taken, directly or indirectly, into a stream of air to be delivered into the cabin of the vehicle, by conventional means not shown.

If the three-way valve 12 is set so that its ways 12-1 and 12-3 are put into communication with each other, the fluid flows in a closed heating loop constituted by the branches 1 and 3, the branch 2 now being isolated. The fluid then passes through the compressor 4, the second expansion device 14, the ejector 16 and the evaporator 5. Since it does not pass through the condenser 6, it remains in the gaseous state all the time. The evaporator 5 then no longer works as an evaporator, but continues to operate as a heat exchanger which enables a large part of the heat produced by the compression of the fluid in the compressor 4 to be dissipated. This heat can then be used for heating the cabin of the vehicle when the heat engine of the vehicle is cold. In particular, since the circulating fluid is at a temperature greater than ambient temperature, a stream of air to be delivered into the cabin can be heated directly by contact with the evaporator.

So long as the stop valve 19 is closed, the mass of the body of fluid circulating in the heating loop 1, 3 is constant. Opening of the valve 19 can be governed in response to the detection of a parameter which represents failure of the heat output produced by the evaporator 5 to reach a sufficiently high value, or in response to a temperature in the cabin which is below a predetermined threshold value. The effect of aspiration (well-known per se) set up by the jet of fluid generated in the ejector 16 in the body of fluid flowing in the heating loop then extracts fluid from the condenser 6 through the inlet 6-1 of the latter and via the junction point C, the stop duct 17 and the inlet 16-3 of the ejector. The incident fluid flow set up in this way joins, in the ejector, the body of fluid in the heating loop. During this phase of introduction of fluid into the heating loop, the fluid continues to flow in the evaporator and to produce heat therefrom.

Figure 2:
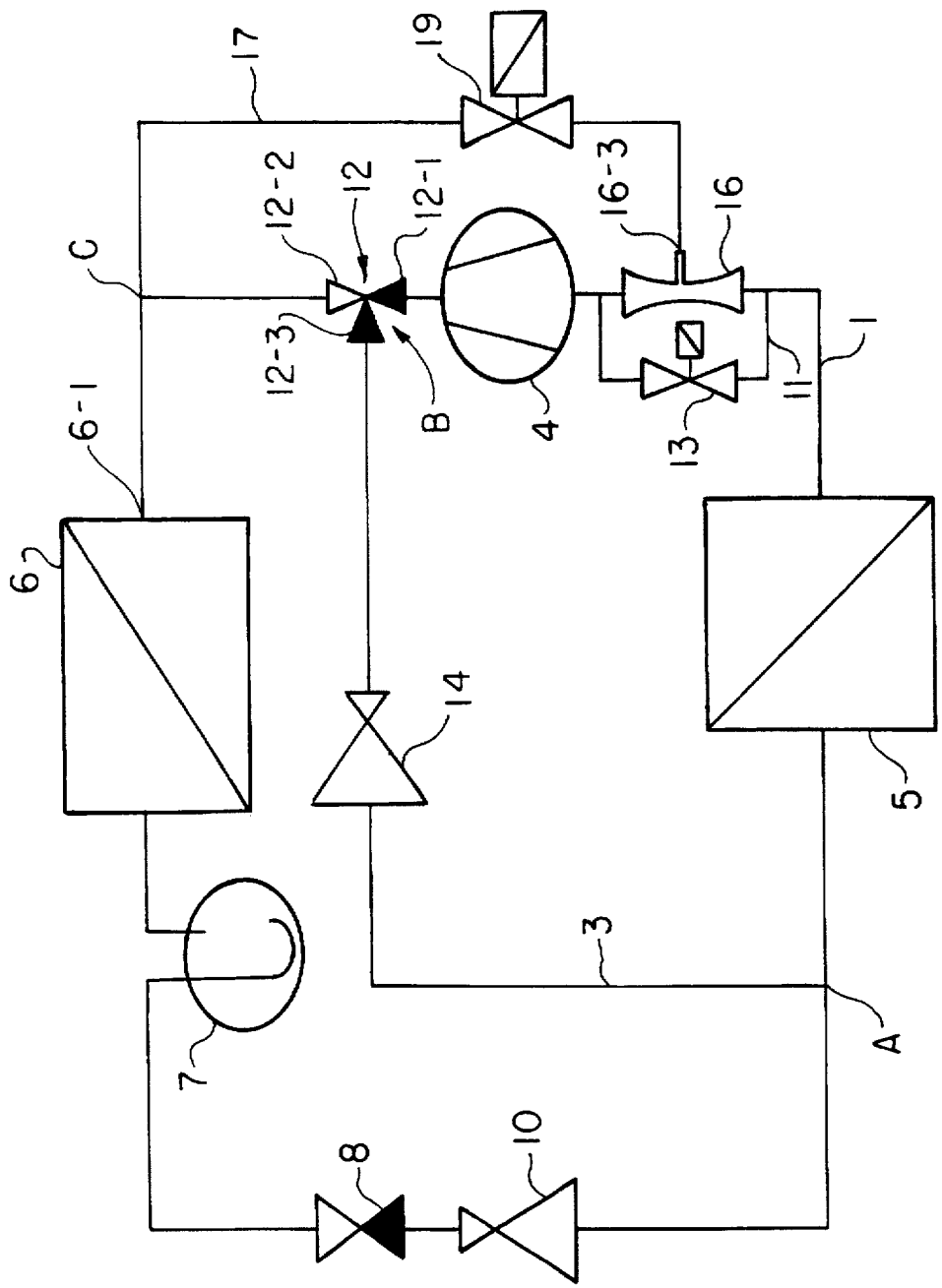

With reference now to FIG. 2, the circuit shown here differs from that in FIG. 1 in that the ejector 16 is connected in the branch 1, between the evaporator 5 and the compressor 4, in parallel with a bypass duct 11 which is provided with a controllable stop valve 13. The valves 12 and 19 are controlled in the same way as described above in connection with the circuit shown in FIG. 1, the valve 19 being closed in the cooling mode of operation. In addition, in the cooling mode, the valve 13 is open so that the fluid passes through the bypass duct 11 as well as through the ejector 16. In the heating mode, the valve 13 is closed and the fluid passes through the ejector 16, which then performs the same function, in conjunction with the valve 19, as in the circuit described with reference to FIG. 1.

Figure 3:
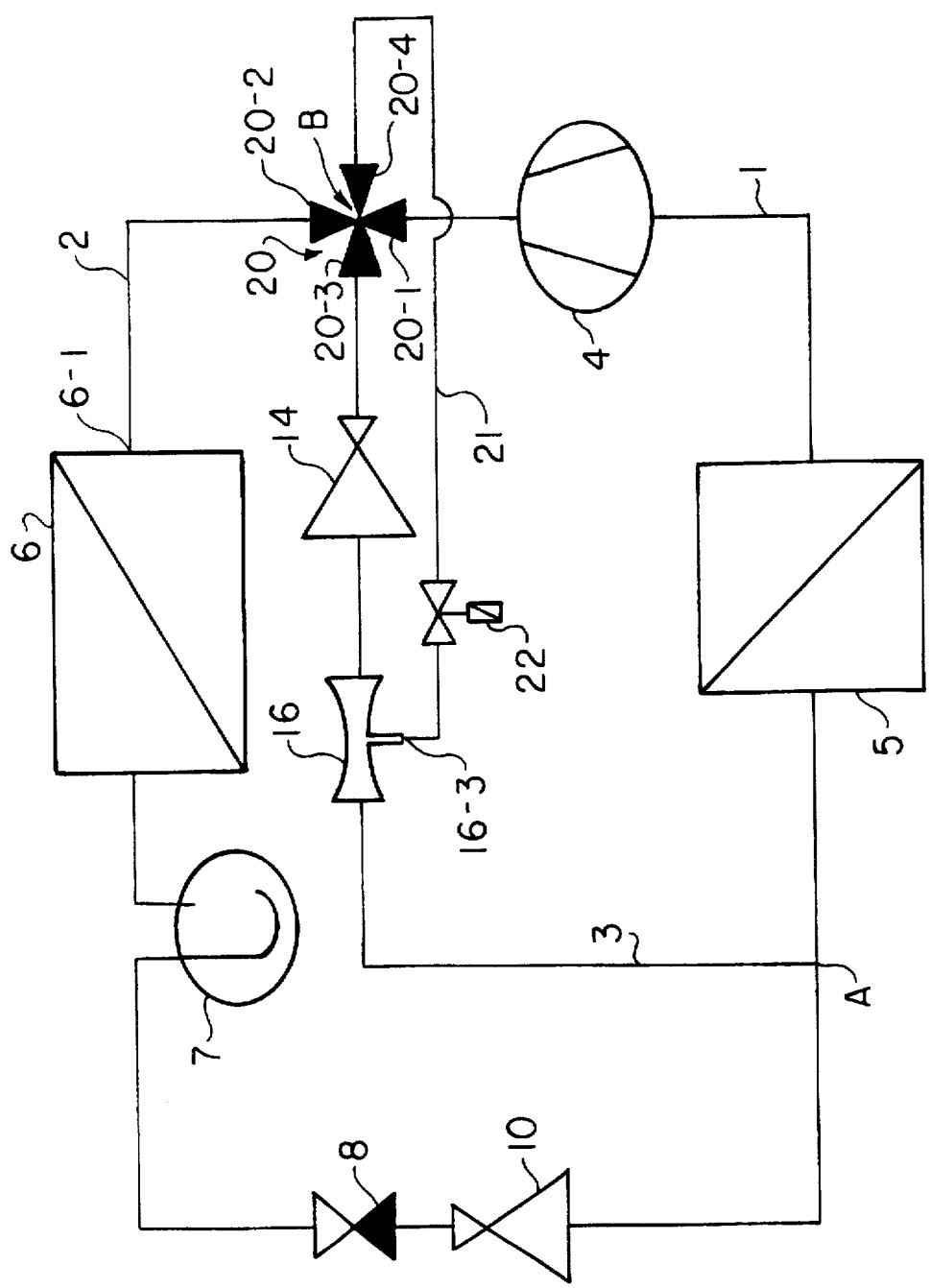

With reference now to FIG. 3, the three-way valve 12 is replaced here by a four-way valve 20, having three ways 20-1, 20-2 and 20-3 which are connected in the same way as are the ways 12-1 to 12-3 of the valve 12 in FIG. 1. The fourth way 20-4 is connected through a duct 21 to the side inlet 16-3 of the ejector 16. The ejector 16 is connected in the same way as in FIG. 1. The duct 21 and the electrically operated changeover valve 20 therefore replace the stop duct 17 and stop valve 19 in FIG. 1, but in other respects the circuit shown in FIG. 3 remains similar to that in FIG. 1. However, it also includes an electrically operated valve 22 which is disposed in the duct 21 between the ejector 16 and the four-way valve 20, in order to obtain, for a mode of operation with a constant fluid mass flow, isolation of the inlet 6-1 of the condenser 6 and isolation of the side inlet 16-3 of the ejector 16 when the valve 22 is closed.

In the cooling mode, the ways 20-1 and 20-2 are in communication with each other, while the ways 20-3 and 20-4 are also in communication with each other. The circuit then operates in the same way as that in FIG. 1. In the heating mode, the ways 20-1 and 20-3 are in communication with each other, thus establishing the closed loop 1, 3. In addition, the ways 20-2 and 20-4 can be either isolated, for operation with a constant mass of fluid, or they can be connected together so as to enable fluid to be extracted from the condenser in the way described above with reference to FIG. 1.

Figure 4:
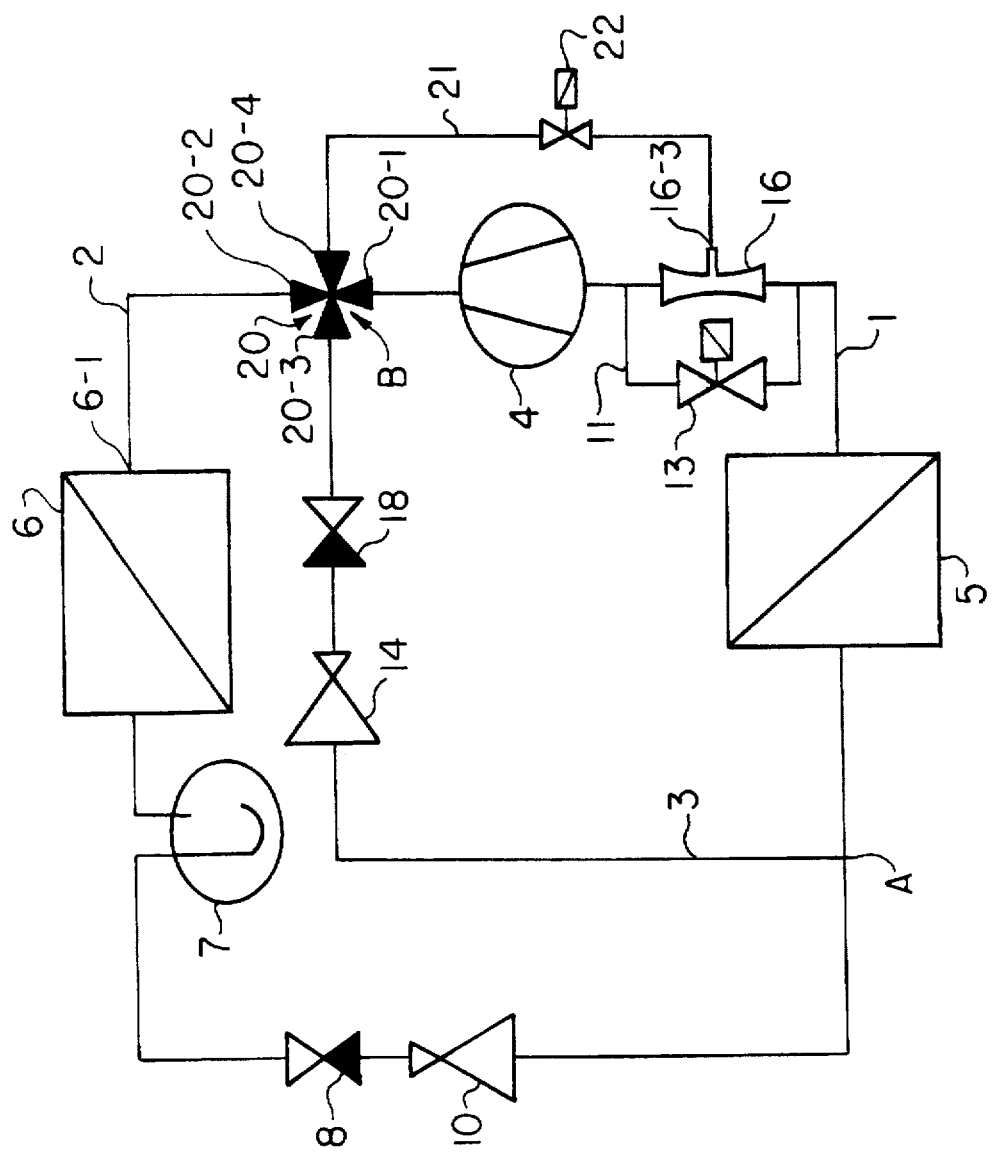

With reference now to FIG. 4, the circuit shown here has, with respect to that in FIG. 3, the same modifications as the circuit of FIG. 2 has with respect to that in FIG. 1. In other words, the ejector 16 is connected in the branch 1 between the evaporator 5 and the compressor 4, in parallel with the bypass duct 11. Each of the valves 13 and 20 is controlled in the manner described above with reference to FIGS. 2 and 3, so as to perform the same functions as for those other versions of the circuit. In addition, a non-return valve is connected in the branch 3 so as to prevent any fluid from flowing in the latter from the junction point A to the junction point B, and thence into the duct 21, in the cooling mode, thus bypassing the evaporator 5.

Various simplifying modifications may be made to the embodiments described above. Thus for example, in the circuits of FIGS. 1 and 3, the ejector 16 may be arranged so that it also performs the function of an expansion device, the expansion device 14 then being omitted. In the circuits of FIGS. 2 and 4, the bypass duct 11 and the stop valve 13 may be omitted. The fluid then passes through the ejector also in the cooling mode, though this does give rise to some loss of load, which has to be set against the said simplification.

What is claimed is:

1. A method of regulating the temperature of an air stream to be delivered into the cabin of a vehicle, by heat exchange with an evaporator in which a refrigerant fluid flows, with said fluid also passing into a compressor and into an expansion device, the said method having a cooling mode for the air stream and a heating mode for the air stream, the method comprising, in the said cooling mode, causing the said fluid to flow successively through the evaporator, the compressor, a condenser in which it gives up heat to another medium, and an expansion device, the method further comprising, in the said heating mode, passing the fluid from the compressor to the evaporator without passing it through any condenser, the method further including, in the said heating mode, and when the mass flow of the body of fluid flowing through the evaporator is insufficient to produce a predetermined amount of heat energy, the step of causing the said body of fluid to produce an aspiration effect, thereby drawing from the condenser an incident mass flow joining the said body of fluid, whereby to augment the latter.

2. Air conditioning apparatus for the cabin of a motor vehicle, comprising a refrigerant fluid circuit having a first branch, a second branch, and a third branch, the second and third branches being in parallel with each other, the circuit further including: an evaporator in said first branch; a first expansion device in said first branch downstream of the evaporator; a compressor in said first branch downstream of the first expansion device; a condenser in said second branch, the third branch being without any condenser; and switching means connected with said branches for connecting together selectively, first, the said first and second branches so as to define a cooling loop, and second, the first and third branches so as to define a heating loop, for circulation of said refrigerant fluid selectively in said cooling and heating loops respectively, wherein the heating loop further includes an ejector having a side inlet, the circuit further including a fourth branch connected between said side inlet of the ejector and the said second branch, and means in said fourth branch for putting said ejector inlet into communication with the condenser, whereby to enable fluid to be drawn from the condenser into the heating loop via the ejector by aspiration effect generated by a body of said fluid flowing in the heating loop, thereby augmenting the said body of fluid.

3. Apparatus according to claim 2, wherein the said means in the fourth branch comprises a valve and control means connected with the said valve for causing the latter to allow and prohibit flow of fluid in the fourth branch.

4. Apparatus according to claim 2, wherein the said switching means are connected with the said branches for selectively connecting the branches in a first mode, in which the downstream end of said first branch is in communication with the upstream end of the second branch, and a second mode, in which the downstream end of the first branch is in communication with the upstream end of the third branch and, simultaneously, the upstream end of the second branch is in communication with the upstream end of the fourth branch.

5. Apparatus according to claim 4, wherein the said switching means are adapted to put the upstream ends of the third and fourth branches into communication with each other, and at the same time to put the downstream end of the first branch into communication with the upstream end of the second branch.

6. Apparatus according to claim 3, wherein the ejector is connected in the third branch.

7. Apparatus according to claim 6, wherein the ejector also constitutes the expansion device of the heating loop.

8. Apparatus according to claim 6, further including a second expansion device for the heating loop, the said second expansion device being connected in series with the ejector in the third branch.

9. Apparatus according to claim 3, wherein the ejector is connected in the first branch.

10. Apparatus according to claim 9, wherein the ejector is interposed between the evaporator and the compressor.

11. Apparatus according to claim 9, further including a bypass duct connected in parallel with the ejector, and a controllable valve connected in the said bypass duct.

12. Apparatus according to claim 9, further including non-return means connected in the third branch.

* * * * *